Aug. 16, 1932.  B. H. PRATT  1,872,003
CROSS LINK FOR TIRE CHAINS
Filed Jan. 14, 1929

INVENTOR.
BENJAMIN H. PRATT.
BY
ATTORNEY.

Patented Aug. 16, 1932

1,872,003

UNITED STATES PATENT OFFICE

BENJAMIN H. PRATT, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

CROSS LINK FOR TIRE CHAINS

Application filed January 14, 1929. Serial No. 332,273.

Figure 1:
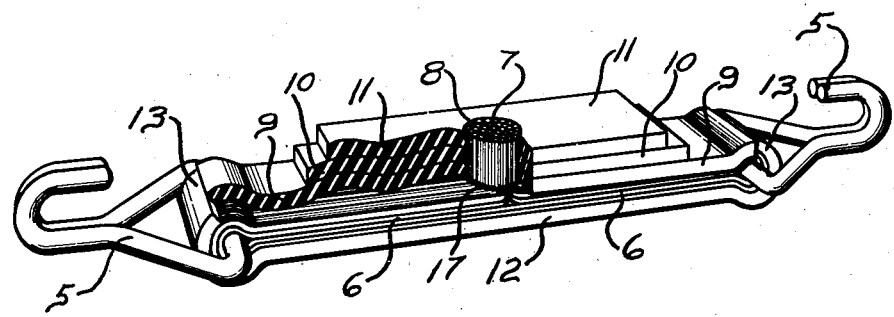
Figure 3:
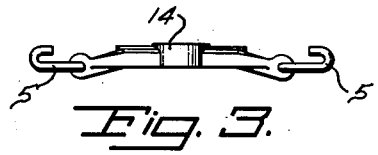
Figure 2:
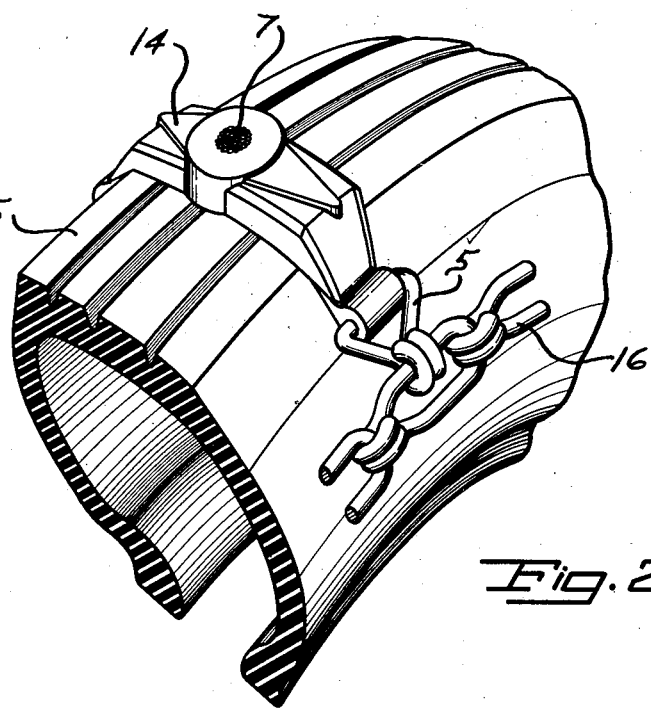

My invention relates to anti-skid tire chains, the cross links of which are formed principally of rubber. It has for one object the provision of a cross link which will possess long wearing qualities and increased traction. A further object is to simplify the construction by a novel manner of incorporating reinforcing elements in the rubber of the cross link. Still further objects will be apparent from the following specification and claims. In the accompanying drawing which shows one embodiment of my invention, Fig. 1 is a perspective view of my improved cross link before vulcanization, showing certain parts broken away so as to more clearly show its construction;

Fig. 2 is a perspective view showing a completed cross link positioned on a section of a tire; and Fig. 3 shows the completed cross link.

In the drawing 5 indicates a pair of side chain engaging hooks which may be of any approved form. Referring to Fig. 1, I lock one of these hooks in each end of the cross link during its construction, the details of construction being as follows; two plies of rubberized reinforcing cord or fabric 6 are locked around the hooks 5 and their ends 7 are bent upwardly as at 17 and compressed or twisted together and the upstanding ends are threaded through a hole 8 formed in the center of the assembly of three or more rubber plies, 9, 10 and 11, which have been previously punched and cut to size. Another ply of rubber 12 is placed on the underside of the rubberized cord layers 6 and its ends 13 are brought around the hooks 5 to meet the ends of the rubber ply 9 as shown. The whole is then firmly pressed or "stitched" together and the ends of the rubberized cord layers 6 are trimmed flush with the top of the rubber ply 11.

The cross link is then vulcanized in any suitable mold which may be cut to shape the cross link to any desired pattern such as is shown in Fig. 3. In Fig. 2 14 indicates the completed cross link positioned on a section of a tire 15 and hooked to ordinary side chains 16. It will be understood that any number of these cross links 14 may be used as desired.

As is shown in Fig. 2, the cord ends 7 are left exposed to give additional traction, especially on wet ice and the like. Since the exposed cords are integral with the central reinforcement there is no danger of the traction pad formed by the cord ends loosening and coming out and the tractive effect of the exposed cords is in no way diminished by wearing away of the rubber up to the time when the link is completely worn out. Incidentally, the pressing or twisting of the cord ends into the vertical pad 7 forms an exceptionally efficient splice to hold the longitudinal reinforcing portions of the cords in position.

It will be understood that various changes may be made in the details of construction. The rubber layers 9, 10 and 11 may be placed in position as a single piece, for example, and the number of plies of reinforcing cords may be varied as desired. The ends of the reinforcing cords may be brought together at various points to provide a plurality of smaller traction pads.

Having thus described my invention, I claim:

1. A cross link for anti-skid chains which comprises a rubber body portion having a road engaging surface, fastening means embedded in the ends of the body portion, a web of fibrous reinforcing material running longitudinal of the body portion and connecting the fastening means, the ends of the web being exposed at the road engaging surface of the body portion.

2. A cross link for anti-skid chains which comprises a rubber body portion having a road engaging surface, fastening means imbedded in the ends of the body portion, a plurality of reinforcing cords running longitudinally of the body portion and connecting the fastening means, the ends of the cords being exposed at the road engaging surface of the body portion.

3. A cross link for anti-skid chains which comprises a rubber body portion having a road engaging surface, fastening means in the form of hooks having loops imbedded in the ends of the body member, a plurality of reinforcing cords running longitudinally of the body portion and through the loops of the fastening means, the free ends of the cords being gathered together substantially centrally of the body portion, the gathered ends of the cords being exposed at the road engaging surface of the body portion.

BENJAMIN H. PRATT.